(12) United States Patent  
Alexander et al.

(10) Patent No.: US 9,408,514 B1  
(45) Date of Patent: *Aug. 9, 2016

(54) METHOD AND APPARATUS FOR TRAVERSING CORNERS OF A FLOORED AREA WITH A ROBOTIC SURFACE TREATMENT APPARATUS

(71) Applicant: NEATO ROBOTICS, INC., Newark, CA (US)

(72) Inventors: Steven Mathew Alexander, Fremont, CA (US); Bruno Augusto Hexsel, Mountain View, CA (US)

(73) Assignee: NEATO ROBOTICS, INC., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,764

(22) Filed: Aug. 22, 2014

Related U.S. Application Data

(63) Continuation of application No. 13/601,655, filed on Aug. 31, 2012, now Pat. No. 8,855,914.

(51) Int. Cl.
| | |
|---|---|
| *G01C 21/00* | (2006.01) |
| *G05B 19/18* | (2006.01) |
| *A47L 11/00* | (2006.01) |
| *A47L 7/00* | (2006.01) |
| *A47L 11/40* | (2006.01) |
| *G05D 1/02* | (2006.01) |

(52) U.S. Cl.  
CPC .......... *A47L 11/4011* (2013.01); *G05D 1/0219* (2013.01); *G05D 2201/0203* (2013.01); *G05D 2201/0215* (2013.01)

(58) Field of Classification Search  
CPC .............. G01C 21/36; G05B 19/0426; G05B 2219/45083; B25J 9/1666; B25J 9/1664; G06N 3/008; A47L 9/2805; A47L 9/2842; A47L 9/2847; A47L 2201/00; A47L 2201/04  
See application file for complete search history.

(56) References Cited

U.S. PATENT DOCUMENTS

| | | | |
|---|---|---|---|
| 4,119,900 | A | 10/1978 | Kremnitz |
| 6,605,156 | B1 | 8/2003 | Clark et al. |
| 7,441,298 | B2 | 10/2008 | Svendsen et al. |
| 2008/0276407 | A1 | 11/2008 | Schnittman et al. |
| 2010/0037418 | A1 | 2/2010 | Hussey et al. |
| 2011/0202175 | A1 | 8/2011 | Romanov et al. |

*Primary Examiner* — Mary Cheung  
(74) *Attorney, Agent, or Firm* — Kenyon & Kenyon LLP

(57) ABSTRACT

A robotic surface treatment apparatus treats corners of rooms more effectively through intricate guidance of the apparatus through inside and outside corners. In one aspect, contact and/or non-contact sensors provide information to one or more on-board processors on the apparatus to enable selective overriding of obstacle avoidance program code and allow the apparatus to get closer to walls to facilitate treatment. In another aspect, the sensors provide information to the on-board processors to control backup motion of the apparatus to cover previously-missed areas when turning corners. In yet another aspect, the apparatus is shaped to have its treatment mechanism positioned more closely to the front of the apparatus to enable treatment more closely to walls near corners. In one embodiment, the robotic surface treatment apparatus is a robotic vacuum. The vacuum may have its cleaning brush positioned near a flat front portion of the apparatus.

30 Claims, 7 Drawing Sheets

METHOD AND APPARATUS FOR TRAVERSING CORNERS OF A FLOORED AREA WITH A ROBOTIC SURFACE TREATMENT APPARATUS

CROSS-REFERENCE TO RELATED APPLICATIONS

The present application is a continuation of application Ser. No. 13/601,655, filed Aug. 31, 2012. This application incorporates by reference the entire contents of that parent application.

BACKGROUND OF THE INVENTION

The present invention relates to robotic surface treatment apparatus. More particularly, the invention relates to intricate guidance of a robotic surface treatment apparatus to traverse paths not previously believed traversable to enable more efficient treatment of corners in a floored area. While the description herein is directed to robotic vacuums, ordinarily skilled artisans will appreciate that the corner guidance aspect of the invention applies more broadly to other types of robotic surface treatment apparatus.

Robotic vacuums clean in their environments by taking various routes through those environments. Rooms in which robotic vacuums operate have various shapes, including corners. Some of these are inside corners, where two walls intersect, as for example in a far end of a room. Some are outside corners, where intersecting walls may form a rectangular or other shape that juts out from a side of the room.

Walls are examples of obstacles that a robotic vacuum will encounter as it traverses a room. Tables, chairs, and other furniture are other examples of obstacles. When a robotic vacuum encounters an obstacle, the robotic vacuum will strike the obstacle, and will either back up, or rotate its wheels or rollers so as to traverse a path around the obstacle. In general, it is desirable to avoid having the robotic vacuum bump into an obstacle, be it a chair leg, a table leg, or a wall. Bumping into obstacles can damage them. Accordingly, robotic vacuums generally are programmed to avoid obstacles when encountered.

In order to detect things like obstacles in and around a room, robotic vacuums need sensors. Some robotic vacuums use what would be termed far-field sensors, to sense contents of a room to be cleaned, identify obstacles to be avoided, and also identify room boundaries, which can include inside corners and outside corners. Robotic vacuums also may use what would be termed near-field sensors, which among other things help in determining when an obstacle is close.

Robotic vacuums have differently-shaped chassis. FIG. 1 shows one such shaped robotic vacuum 100, which may be referred to herein as a "D-shape," though the essential feature here is that the front portion of the robotic vacuum is substantially flat or straight, rather than curved. The flatness of the front portion of the robotic vacuum yields the advantage that a brush 110 may be positioned more closely toward the front of the device, enabling the robotic vacuum to clean more closely to obstacles around or near which the robotic vacuum is supposed to clean.

The robotic vacuum 100 depicted in this Figure includes a chassis having a front portion 130 and a rear portion 140. The brush 110 is disposed in the front portion 130, and wheels or rollers 120 are disposed in the rear portion 140. The chassis may have a bumper (not specifically shown) which can contract when the robotic vacuum encounters an obstacle. Inside or in proximity to the bumper there may be one or more sensors 160. These may be contact sensors (e.g. sensors which send signals when some portion or all of the bumper is pushed back sufficiently upon encountering an obstacle to create a contact between two opposed portion). These may be non-contact sensors (e.g. optical or ultrasonic sensors which may use ranging to identify the distance from an obstacle). Placement of these sensors on the robotic vacuum 100 can depend on type and purpose.

One or more suitably programmed processors 150 in the robotic vacuum implement various algorithms, stored as program code in inboard or outboard memory 155, to enable the device to traverse a room, and in particular to cover all of the floored area in order to remove dirt, dust, and other debris. The processor(s) also may control robotic vacuum behavior upon encountering an obstacle.

FIG. 2 shows a scenario in which the robotic vacuum 100 is proceeding along a wall, toward a corner. The robotic vacuum needs to be able to turn the corner (in this case, to its left, which is to the right in FIG. 2) and continue to proceed along the wall portion 200. In order for that to happen, in the past the robotic vacuum has pivoted soon enough before encountering the wall portion 200 to be able to avoid the wall portion 200, and then proceed along it.

With damage avoidance in mind, corner traversal has involved guiding the robotic vacuum in an arcuate path from following one wall to following an adjacent wall. FIG. 3 shows an example of such a path, avoiding contact with the adjacent wall. As can be seen from the figure, a relatively sizable swath in the corner remains uncleaned after the robotic vacuum turns the corner.

While traversing inside corners presents one kind of problem, traversing outside corners presents another kind of problem. Unlike inside corners, for which wall detection is relatively straightforward, outside corners involve detection of the absence of a wall, in order for the robotic vacuum to turn to follow the further wall that defines the rest of the corner.

It would be desirable to be able to control the robotic vacuum so that it would recognize inside and outside corners, and in response to that recognition, take a path that enables more complete cleaning of floored areas.

SUMMARY OF THE INVENTION

In view of the foregoing, it is one object of the present invention to provide a method and apparatus as implemented or embodied in a robotic surface treatment apparatus to traverse corners so as to enables better surface treatment, including cleaning of both inside and outside corners, than previously was possible.

In accordance with the foregoing and other objects, one aspect of the invention involves instructing the robotic surface treatment apparatus to contact a wall upon detecting an inside corner, and/or turning or pivoting upon detecting an outside corner. Coupled with a suitable shape for the surface treatment apparatus, including placement of a treatment mechanism proximate a forward end of the apparatus, the invention enables efficient surface treatment of inside and outside corners of a floored area.

BRIEF DESCRIPTION OF THE DRAWINGS

The invention now will be described in detail with reference to one or more exemplary embodiments with reference to the accompanying drawings, in which.

DETAILED DESCRIPTION

The following description focuses on a particular type of surface treatment apparatus, a robotic vacuum, to make it easier to appreciate how the invention works, However, as noted earlier, the invention is not so limited. Rather, the invention applies to numerous types of robotic surface treatment apparatus.

It also should be noted that, with respect to the described embodiments of the robotic vacuum, or indeed of surface treatment apparatus more generally, many of the details are not critical to the invention. For example, the brush 110 that is shown need not be the only brush. Additional brushes may be placed elsewhere. Also, in the case of a robotic vacuum, other mechanisms for cleaning dust, dirt, or other debris are contemplated. In one aspect, proximity of brush structure or other cleaning mechanism to the front of the apparatus is desirable because it facilitates cleaning closer to corners. The proximity to the front of the apparatus is applicable to other types of surface treatment apparatus as well.

Other types of contact or non-contact sensors, beyond the ones mentioned herein, also may be used. Wheel or roller mechanism structure and placement, as well as placement of debris receptacles, vacuum motors, ductwork, and the like also are not critical to the invention, and so are not described herein. Ordinarily skilled artisans will be familiar with various robotic surface treatment apparatus implementations. The present invention focuses on improvements in control of such implementations to promote better surface treatment, including cleaning.

Figure 3:
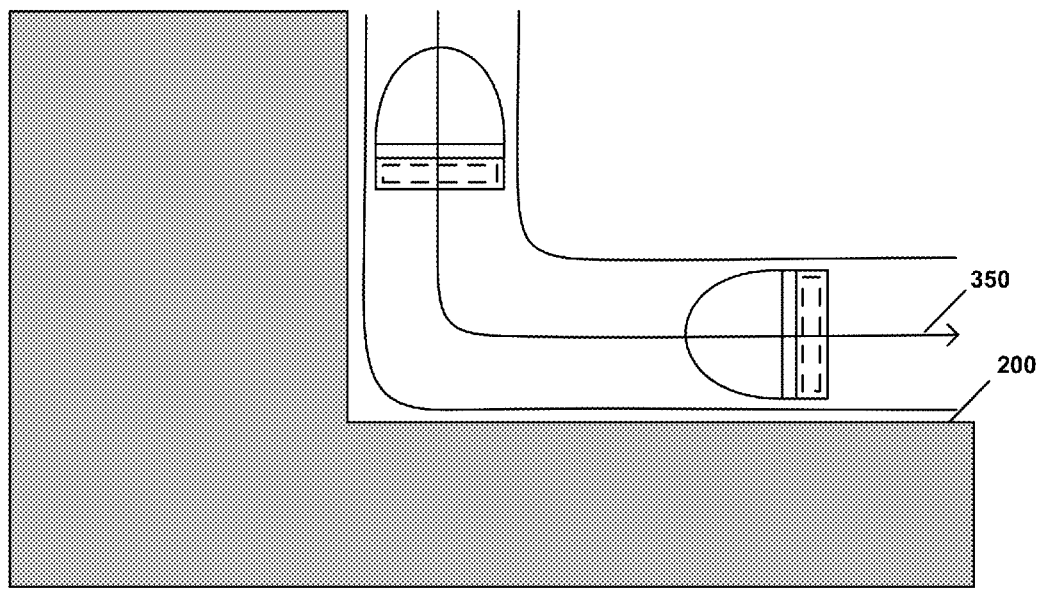
FIG. 3 depicts a conventional traversal path of a robotic vacuum turning an inside corner.
Figure 4:
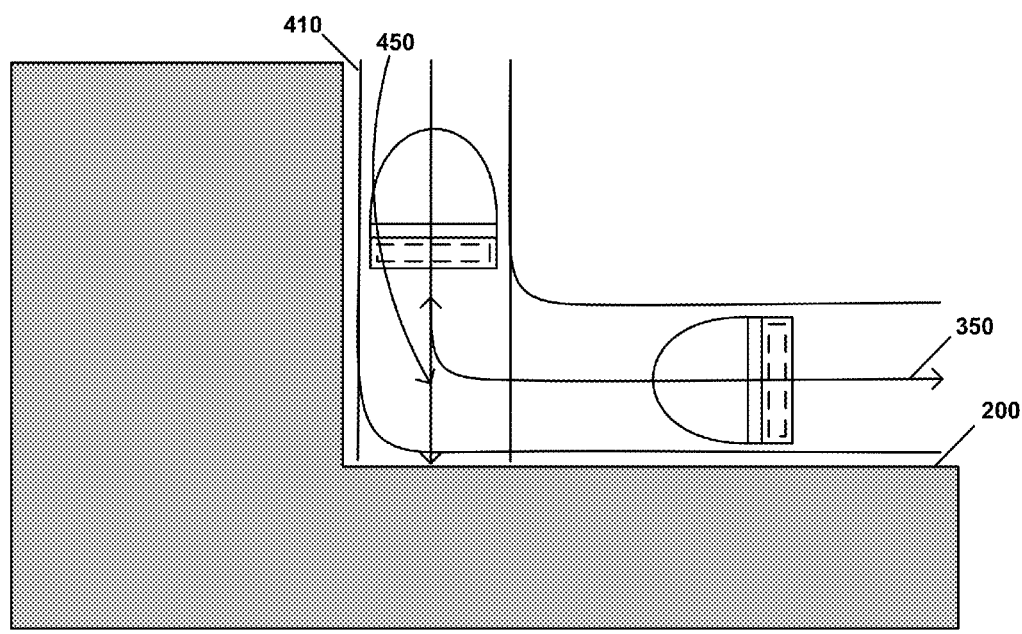
FIG. 4 depicts a traversal path of a robotic vacuum turning an inside corner, in accordance with one aspect of the present invention.

Looking now at FIG. 4, which depicts traversal of an inside corner in accordance with one aspect of the invention, in order for the robotic vacuum to follow the edge of the first wall, the processor executes program code implementing one or more wall following algorithms. While following the first wall and approaching a corner, the robotic vacuum will approach the further wall and determine proximity to that further wall. Rather than stop short as in FIG. 3, the robotic vacuum will contact the wall as shown by the downward pointing arrow depicting path 450. In order for this contact to take place, it is necessary to override the contact avoidance algorithm(s) that normally would run. The information necessary to do this is complex, because ordinarily the robotic vacuum can and should take action to avoid contacting an obstacle. Therefore, the obstacle avoidance algorithm(s) should be overridden selectively, and only under certain circumstances: in this case, detection of an inside corner.

In accordance with one aspect of the invention, then the processor(s) and associated program code will use the information acquired through following the first wall, along with information received regarding proximity to the further wall, to determine that the vacuum is approaching an inside corner. In this circumstance, the necessary contact avoidance algorithm(s) will be overridden, and the processor(s) and the associated program code will control the robotic vacuum to contact the wall. The information regarding proximity to the further wall may be acquired through ultrasonic or optical sensing, enabling detection of two line segments that are intersecting to signify an inside corner, for example. The robotic vacuum may be controlled to slow down or stop when the robotic vacuum is within a predetermined distance from the further wall. Thus, the robotic vacuum may slow down as it approaches the further wall, or as it contacts the further wall, or may maintain its speed until it contacts the further wall.

In order to be effective but not damaging, the robotic vacuum contact with the further wall should be sufficiently soft to avoid damage to either the wall or the vacuum, but will be firm enough for the vacuum to know that it has contacted the wall, and therefore that the brush 110 has come as close to the wall as practicable. Upon detecting contact through one or more of the sensors 160 (e.g. bump sensors positioned at or near the front end of the chassis), the robotic vacuum will back up, in the direction of the upwardly pointing arrow, along path 450. In one aspect, the robotic vacuum will turn or pivot away from the first wall, and will follow the further wall.

One goal that the movement control algorithms have to accomplish is the overriding of the obstacle avoidance algorithms when a corner is detected. This can be tricky, because as noted earlier, it is desirable to avoid obstacles, and not run into them. However, in accordance with this aspect of the invention, it will be desirable, in the case of corner detection, for the robotic vacuum to contact the further wall, or come very close to it. In order to accomplish this level of proximity, the processor in the robotic vacuum must recognize appropriately that obstacle contact—in this case, with a wall—is acceptable. Then, once the robotic vacuum contacts the wall, the vacuum should back up until it can turn. The point at which the vacuum can turn may be one at which it is determined that overriding of obstacle avoidance algorithm(s) is no longer necessary. In that case, the obstacle avoidance algorithm(s) can be re-engaged at that time, and the vacuum can be made to turn as it would when avoiding an obstacle, in this case, the further wall. Alternatively, the obstacle avoidance algorithms can be reengaged at a later time. Now, however, when the robotic vacuum avoids the obstacle and turns, the swath that was previously uncleaned will have been cleaned because of the vacuum's approaching and contacting the wall.

In a number of circumstances, the obstacle avoidance algorithm(s) may include instructions to slow the robotic vacuum down as it gets within a predetermined distance of an obstacle. As part of overriding the obstacle avoidance algorithm(s) in order to facilitate corner cleaning, it may be desirable to slow the robotic vacuum down, so as to reduce or eliminate damage from contact to either the wall or the vacuum. However, depending on how fast the robotic vacuum is moving, slowing the vacuum down may not be necessary, so the invention should not be construed so as to limit the activity of the robotic vacuum in proximity to a wall as part of the corner cleaning process.

Using a sensor in the chassis to determine proximity to the wall may involve one type of algorithm to enable further control of the robotic vacuum. Using laser readings, for example, from a laser detection system (LDS), will involve processing of the laser reading data to detect line segments using line extraction and clustering algorithms, as will be known to ordinarily skilled artisans. Extraction of the line segments enables corner detection by assessing angles between nearby or adjacent line segments. Corner detection per se is not part of the invention; control of robotic vacuum behavior upon corner detection is.

In one aspect, the shape of the chassis of the robotic vacuum, coupled with the placement of the main cleaning brush, facilitates reduction of the previously-missed swath of flooring area. With a D-shaped chassis 100, or at least with a chassis with a flat front forward end 130, and a cleaning brush 110 placed near the front of the forward end 130, much of the space in path 410 (FIG. 4) will be cleaned, leaving a smaller portion uncleaned than previously was the case. If the chassis is shaped so that the brush has to be farther away from the front of the robotic vacuum, there will be more space between the brush and the further wall when the vacuum contacts the wall, and so there will be more uncleaned space.

In the Figures describing the embodiment for cleaning inside corners, the corner shown is 90°. However, the invention is not so limited. The angle may be greater or less than 90°. If the angle is less than 90°, the size of the uncleaned space may tend to be larger than would be the case if the angle were equal to 90°. The movement of the robotic vacuum to traverse the uncleaned space may be more complicated, and in one embodiment, the cleaning may be less efficient. If the angle is greater than 90°, the size of the uncleaned space may be smaller than would be the case if the angle were equal to 90°. However, the movement of the robotic vacuum to traverse the uncleaned space would be substantially the same as if the angle were equal to 90°.

Figure 5A:
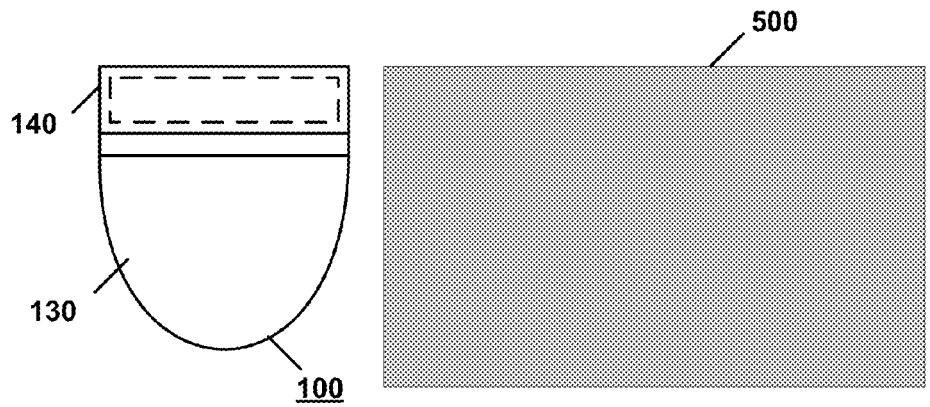
FIGS. 5A-C depict a robotic vacuum relative to an outside corner.
Figure 5B:
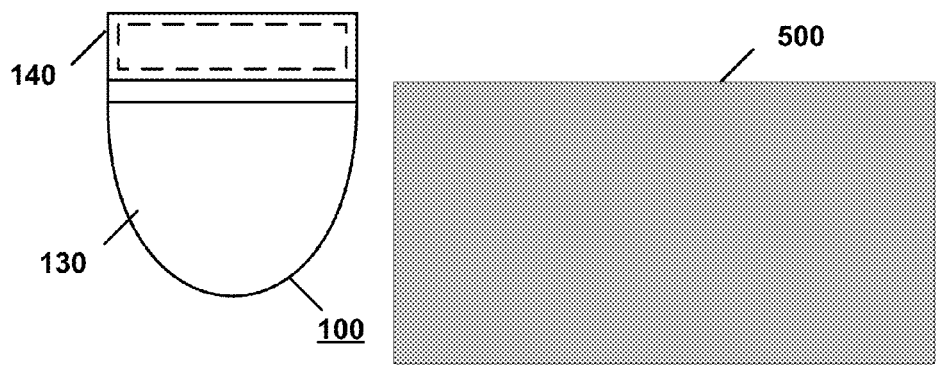
Figure 5C:
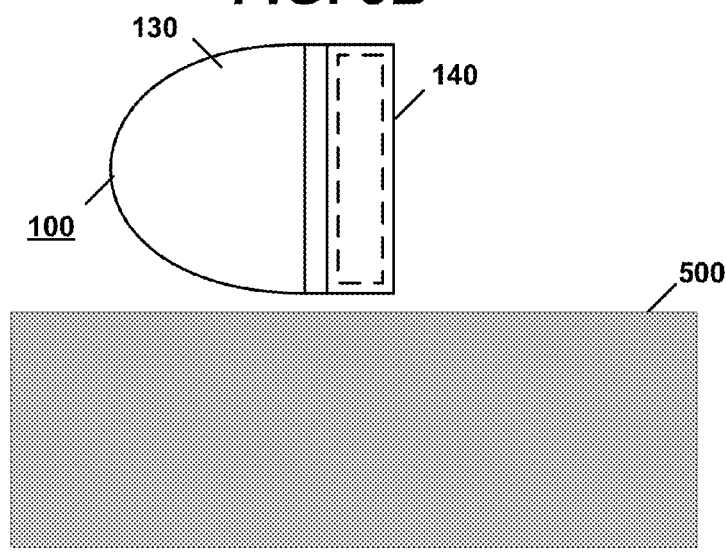

Having just described cleaning of an inside corner of a floored area, cleaning of an outside corner of a floored area now will be described. FIG. 5A depicts a robotic vacuum traversing a floored area, following a wall edge, similarly to what is described above with respect to the handling of inside corners. As part of determining to follow the wall edge, the robotic vacuum may have detected the wall edge, and then moved in a path along that wall edge. FIG. 5B shows the robotic vacuum passing the wall edge, and FIG. 5C shows the robotic vacuum following a further wall edge after turning or pivoting. As part of determining to follow the further wall edge, the robotic vacuum may have detected that it is no longer following the first wall edge, i.e. that it has passed that wall. Appropriate optical or ultrasonic sensing may provide information to the robotic vacuum to indicate that the absence of the first wall edge signifies a further wall edge. The robotic vacuum then can pivot toward the further wall edge, approach the further wall edge, and then move along it.

Figure 6:
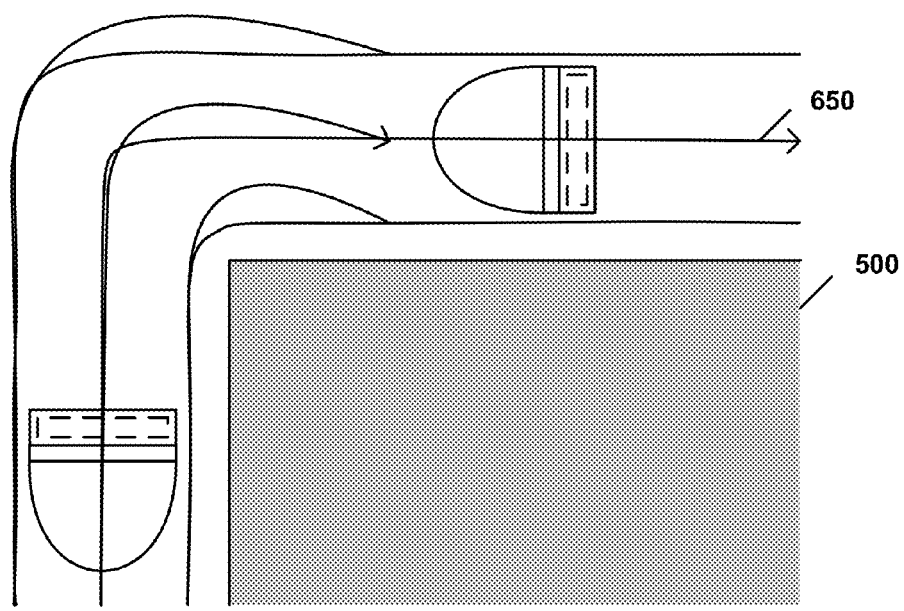
FIG. 6 depicts a traversal path of a robotic vacuum turning an outside corner.

FIG. 6 shows the path that the robotic vacuum traverses as a result of turning an outside corner, following first one wall edge, and then the further wall edge. As can be seen, the path takes the robotic vacuum past the further wall, and then back toward the further wall. As a result of this traversal, involving physical constraints because of the location of the cleaning brush and the wheels within the chassis of the robotic vacuum, as well as possible limitations on current sensors and on the ability of the robotic vacuum to react to the sensors, there will be a swath that will be left uncleaned.

Figure 1:
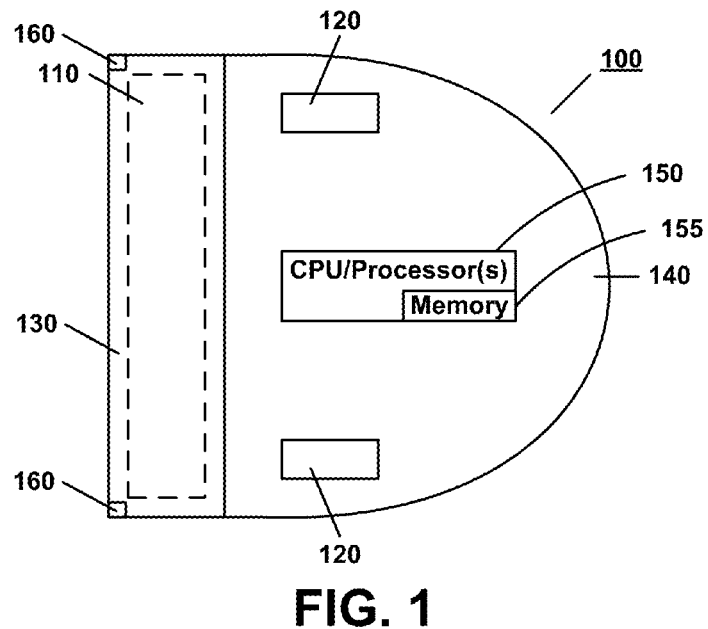
FIG. 1 depicts a robotic vacuum as an example of a surface treatment apparatus.
Figure 2:
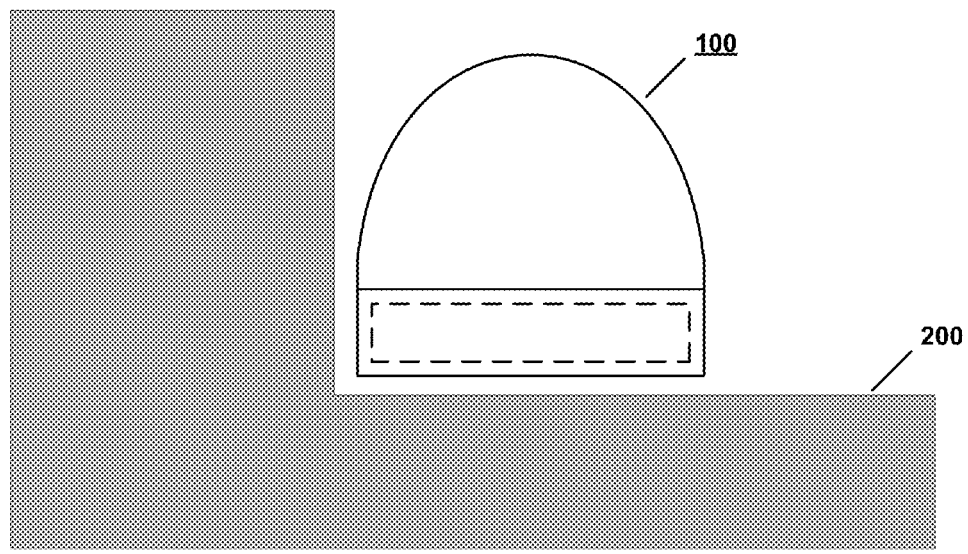
FIG. 2 depicts a robotic vacuum relative to an inside corner in a room which the vacuum is traversing.
Figure 7:
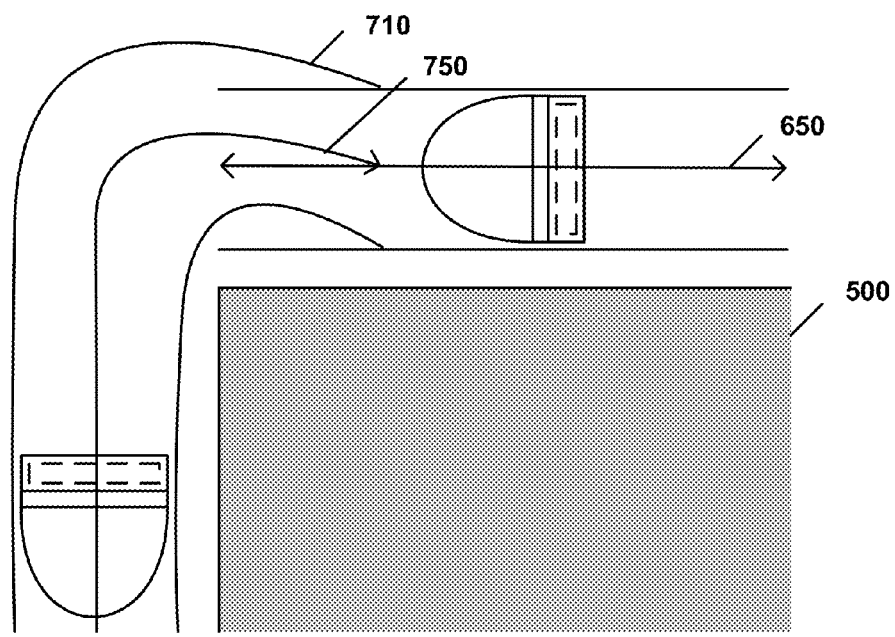
FIG. 7 depicts a traversal path of a robotic vacuum turning an outside corner, in accordance with one aspect of the present invention.

FIG. 7 shows the traversal path of a robotic vacuum along an outside corner in accordance with one aspect of the invention. The goal being to eliminate, to the extent possible, the uncleaned swath shown in FIG. 6, in one aspect the robotic vacuum will detect the further wall edge after turning or pivoting, and then will back up in the direction of the arrow pointing to the left in FIG. 7 along path 750, to clean the swath that was missed when the vacuum turned or pivoted. The robotic vacuum may have to back up by different amounts depending on the position of the cleaning brush relative to the chassis in the vacuum, and on the location of the wheels, which will determine how quickly the robotic vacuum will be able to pivot upon detection of the outside corner. With the cleaning brush positioned near the front of the vacuum, as shown in FIG. 1, the robotic vacuum will have to back up sufficiently for the cleaning brush to clean the swath that was missed. In any event, in one aspect, after backing up, the robotic vacuum then will move in the direction of the arrow pointing to the right in FIG. 7 along path 750, to continue cleaning along the further wall edge.

In another aspect, the ability of the robotic vacuum to detect that it is no longer following the first wall edge may be such that turning or pivoting will completely or nearly completely follow the outside corner, so that no backing up, or less backing up of the robotic vacuum will be required to clean the swath shown in FIG. 6.

Detecting and cleaning around an outside corner presents a somewhat different set of problems than does detecting and cleaning around an inside corner. For one thing, the obstacle avoidance issue for an outside corner is different, because when cleaning around an outside corner, there should be no need to override the obstacle avoidance algorithm(s), as there should be no need for the robotic vacuum to contact either wall in an outside corner. For another, the algorithms for determining an outside corner, involving not only the handling of proximity information to the further wall but also the handling of information signifying the absence of the first wall (i.e. that the robotic vacuum is going past the first wall, or that the first wall is ending) will be different.

Still further, the control of a robotic vacuum to back up in the case of an outside corner will be different. In the case of an inside corner, the vacuum will back up upon encountering an obstacle, as has been the case. However, in the case of an outside corner, the need for the robotic vacuum to back up is not the result of encountering an obstacle. Rather, in cleaning the floor swath left behind as a result of turning or pivoting around the outside corner, the robotic vacuum should proceed far enough to be following the further wall edge. It is possible that, in the case of a short further wall edge, the robotic vacuum would be in the process of detecting yet another outside corner, when it has not finished cleaning the first one yet. To address this, the program code in the processor(s) should enable prioritization of finishing the current mode of movement, i.e. cleaning the first outside corner, before proceeding to another mode of operation.

From the foregoing discussion, it can be appreciated that the algorithm(s) and associated program code for backing up the robotic vacuum to finish cleaning an outside corner are also tricky.

In the Figures describing the embodiment for cleaning outside corners, the corner shown is 90°. However, the invention is not so limited. The angle may be greater or less than 90°. If the angle is less than 90°, the size of the uncleaned space may tend to be smaller than would be the case if the angle were equal to 90°, because the turning or pivoting of the robotic vacuum after passing the first wall edge may account for a substantial portion of the uncleaned floor swath. The movement of the robotic vacuum to traverse the uncleaned space may be substantially the same as if the angle were equal to 90°. If the angle is greater than 90°, the size of the uncleaned space may be greater than would be the case if the angle were equal to 90°, because the turning or pivoting of the robotic vacuum may not occur as quickly after passing the first wall edge, because the proximity of the further wall edge may delay detection that the robotic vacuum has passed the first wall edge. In that event, the movement of the robotic vacuum to traverse the uncleaned space would not be substantially more complicated than if the angle of the outside corner were equal to 90°, but the robotic vacuum may have to back up farther in order to cover the uncleaned floor swath.

Figure 8:
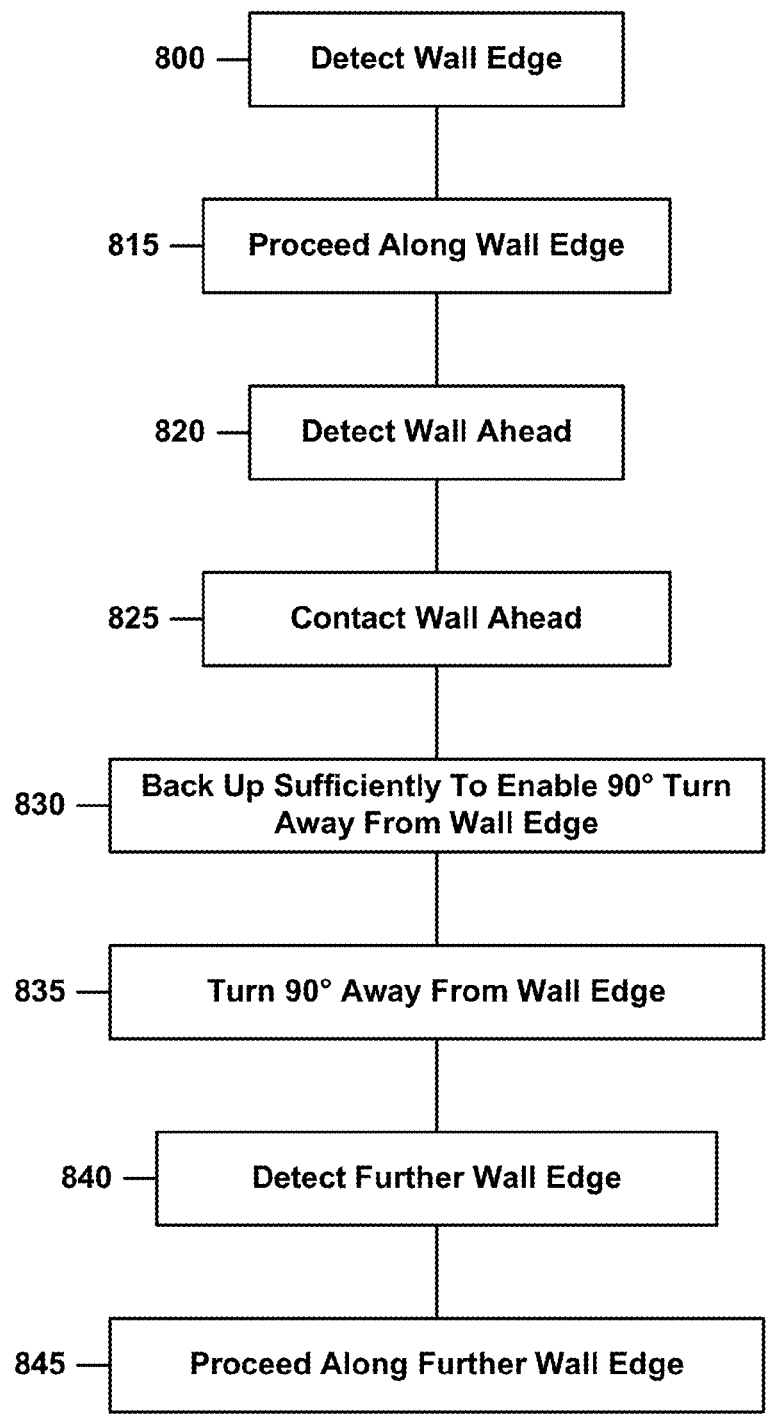
FIG. 8 depicts the flow of operation of a robotic vacuum as it traverses an inside corner in accordance with one aspect of the present invention.

In accordance with the flow depicted in FIG. 8, a robotic vacuum in accordance with one aspect of the present invention will traverse an inside corner as follows. As the robotic vacuum goes along the floor in this aspect of the invention, the vacuum first detects a wall edge (step 810), and then proceeds along the wall edge (step 815), as shown in FIG. 4. As the robotic vacuum approaches a wall, signifying coming to a corner, the vacuum detects the approaching wall (step 820). The robotic vacuum will contact the wall (step 825). It is desirable to minimize damage to the wall, as well as to the robot. In one aspect, the vacuum may slow down as it approaches the wall. In another aspect, the vacuum may be proceeding sufficiently slowly so as not to necessitate slowing down.

After the robotic vacuum contacts the wall, it backs up sufficiently to enable the robotic vacuum to turn or pivot away from the wall edge (step 830). The robotic vacuum then turns or pivots (step 835). In FIG. 8, the amount of the turn or pivot is stated to be 90°, but that assumes a right angle corner. Since the important aspect here is the ability to turn and follow the corner, the angle may be greater or less than 90°. In this aspect of the invention, by contacting the wall and then backing up, the brush in the robotic vacuum sweeps up the area closer to the wall than previously was the case, and avoids the kind of uncleaned swath that FIG. 3 depicts.

After backing up sufficiently to enable the turn or pivot, the robotic vacuum then detects the edge of the wall it just contacted (step 840), and then proceeds along that wall edge (step 845).

Figure 9:
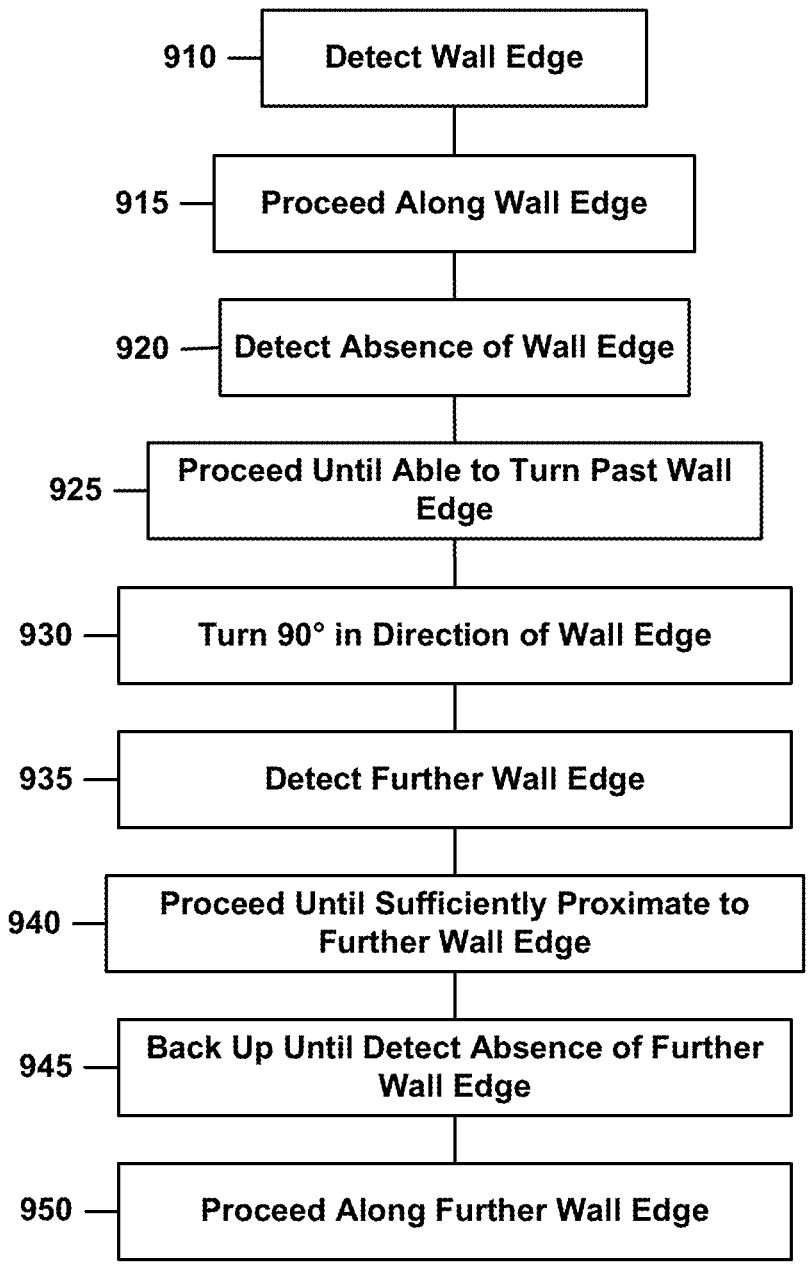
FIG. 9 depicts the flow of operation of a robotic vacuum as it traverses an outside corner in accordance with one aspect of the present invention.

In accordance with the flow depicted in FIG. 9, a robotic vacuum in accordance with one aspect of the present invention will traverse an outside corner as follows. As the robotic vacuum goes along the floor in this aspect of the invention, the vacuum first detects a wall edge (step 910), and then proceeds along the wall edge (step 915). As the robotic vacuum moves along, eventually it no longer detects the wall edge (step 920). The robotic vacuum then will continue to move until it is able to turn or pivot past the wall edge, in the direction of the wall edge (step 925). The robotic vacuum then turns or pivots in the direction of the wall edge (step 930), toward the further wall edge that defines the other edge of the corner. In FIG. 9, the amount of the turn or pivot is stated to be 90°, but that assumes a right angle corner. Since the important aspect here is the ability to turn and follow the corner, the angle may be greater or less than 90°.

After turning or pivoting, the robotic vacuum then detects the further wall edge (step 935), and then proceeds until it is sufficiently proximate to the further wall edge (step 940). As shown in FIG. 7, because the robotic vacuum may overshoot the corner, it may have to come back toward the further wall edge, leaving an uncleaned swatch near the corner. To address this overshoot, the robotic vacuum may back up until it detects the absence of that wall edge (step 945), and then proceeds forward along the further wall edge (step 950).

In this aspect of the invention, by turning around the corner, finding the further wall edge, and then backing up, the brush in the robotic vacuum sweeps up the area closer to the wall than previously was the case, and avoids the kind of uncleaned swath that FIG. 6 depicts.

While the foregoing describes the invention in detail relative to certain embodiments, other embodiments within the scope and spirit of the invention will be apparent to ordinarily skilled artisans. In particular, ordinarily skilled artisans will appreciate that the corner guidance aspect of the invention applies more broadly to other types of robotic surface treatment apparatus than just robotic vacuums. Both wet and dry robotic cleaning apparatus, robotic waxing apparatus, and other types of robotic surface treatment apparatus, will benefit from the improved guidance that the invention enables. Consequently, the invention is not to be considered as limited to the disclosed embodiments, but rather should be considered to encompass the full scope of the attached claims.

What is claimed is:

1. A robotic surface treatment apparatus comprising:
   a chassis; and
   one or more processors that detect whether the robotic surface treatment apparatus is about to traverse a corner as the robotic surface treatment apparatus travels along a first wall, by detecting whether the robotic surface treatment apparatus is about to contact a second wall;
   wherein, if the robotic surface treatment apparatus is about to contact the second wall, the one or more processors:
      control the robotic surface treatment apparatus to be at a distance from the second wall, sufficient to enable the robotic surface treatment apparatus to turn the corner; and
      cause the robotic surface treatment apparatus to pivot and move forward so that it follows the second wall.

2. A robotic surface treatment apparatus as claimed in claim 1, wherein the one or more processors further detect whether the robotic surface treatment apparatus is no longer traveling along the first wall;
   wherein, if the robotic surface treatment apparatus is no longer traveling along the first wall, the one or more processors:
      cause the robotic surface treatment apparatus to pivot and continue moving forward; and
      if the robotic surface treatment apparatus is traveling along a further wall, cause the robotic surface treatment apparatus to move forward to follow the further wall.

3. A robotic surface treatment apparatus as claimed in claim 2, wherein:
   if the robotic surface treatment apparatus is traveling along the further wall, the one or more processors control the robotic surface treatment apparatus to back up by a predetermined amount before causing the robotic surface treatment apparatus to move forward to follow the further wall.

4. A robotic surface treatment apparatus as claimed in claim 1, wherein the chassis has a D-shape with a substantially flat forward end.

5. A robotic surface treatment apparatus as claimed in claim 4, wherein the apparatus comprises a robotic vacuum having a brush extending along a substantial portion of the forward end, toward the forwardmost part of the forward end.

6. A processor-implemented method of controlling a robotic surface treatment apparatus, the method comprising:
   using one or more processors to detect whether the robotic surface treatment apparatus is about to traverse a corner as the robotic surface treatment apparatus travels along a first wall, by detecting whether the robotic surface treatment apparatus is about to contact a second wall;

wherein, if the robotic surface treatment apparatus is about to contact the second wall, the one or more processors:
control the robotic surface treatment apparatus to be at a distance from the second wall, sufficient to enable the robotic surface treatment apparatus to turn the corner; and
cause the robotic surface treatment apparatus to pivot and move forward so that it follows the second wall.

7. A processor-implemented method of controlling a robotic surface treatment apparatus as claimed in claim 6, further comprising detecting whether the robotic surface treatment apparatus is no longer traveling along the first wall;
wherein, if the robotic surface treatment apparatus is no longer traveling along the first wall, the one or more processors:
cause the robotic surface treatment apparatus to pivot and continue moving forward; and
if the robotic surface treatment apparatus is traveling along a further wall, cause the robotic surface treatment apparatus to move forward to follow the further wall.

8. A processor-implemented method as claimed in claim 7, wherein:
if the robotic surface treatment apparatus is traveling along the further wall, the one or more processors control the robotic surface treatment apparatus to back up by a predetermined amount before causing the robotic surface treatment apparatus to move forward to follow the further wall.

9. A processor-implemented method as claimed in claim 6, wherein the robotic surface treatment apparatus has a D-shape with a substantially flat forward end.

10. A processor-implemented method as claimed in claim 9, wherein the apparatus comprises a robotic vacuum having a brush extending along a substantial portion of the forward end, toward the forwardmost part of the forward end.

11. A tangible recording medium containing processor-implemented instructions to perform a method of controlling a robotic surface treatment apparatus, the method comprising:
using one or more processors to detect whether the robotic surface treatment apparatus is about to traverse a corner as the robotic surface treatment apparatus travels along a first wall, by detecting whether the robotic surface treatment apparatus is about to contact a second wall;
wherein, if the robotic surface treatment apparatus is about to contact the second wall, the one or more processors:
control the robotic surface treatment apparatus to be at a distance from the second wall, sufficient to enable the robotic surface treatment apparatus to turn the corner; and
cause the robotic surface treatment apparatus to pivot and move forward so that it follows the second wall.

12. A tangible recording medium containing processor-implemented instructions to perform a method of controlling a robotic surface treatment apparatus as claimed in claim 11, further comprising detecting whether the robotic surface treatment apparatus is no longer traveling along the first wall;
wherein, if the robotic surface treatment apparatus is no longer traveling along the first wall, the one or more processors:
cause the robotic surface treatment apparatus to pivot and continue moving forward; and
if the robotic surface treatment apparatus is traveling along a further wall, cause the robotic surface treatment apparatus to move forward to follow the further wall.

13. A tangible recording medium containing processor-implemented instructions to perform a method of controlling a robotic surface treatment apparatus as claimed in claim 12, wherein:
if the robotic surface treatment apparatus is traveling along the further wall, the one or more processors control the robotic surface treatment apparatus to back up by a predetermined amount before causing the robotic surface treatment apparatus to move forward to follow the further wall.

14. A tangible recording medium containing processor-implemented instructions to perform a method of controlling a robotic surface treatment apparatus as claimed in claim 11, wherein the robotic surface treatment apparatus has a D-shape with a substantially flat forward end.

15. A tangible recording medium containing processor-implemented instructions to perform a method of controlling a robotic surface treatment apparatus as claimed in claim 14, wherein the apparatus comprises a robotic vacuum having a brush extending along a substantial portion of the forward end, toward the forwardmost part of the forward end.

16. A robotic surface treatment apparatus comprising:
a chassis; and
one or more processors that detect whether the robotic surface treatment apparatus is about to traverse a corner as the robotic surface treatment apparatus travels along a first wall, by detecting whether the robotic surface treatment apparatus is no longer traveling along the first wall;
wherein, if the robotic surface treatment apparatus is no longer traveling along the first wall, the one or more processors:
cause the robotic surface treatment apparatus to pivot and continue moving forward; and
if the robotic surface treatment apparatus is traveling along a further wall, cause the robotic surface treatment apparatus to move forward to follow the further wall.

17. A robotic surface treatment apparatus as claimed in claim 16, wherein:
if the robotic surface treatment apparatus is traveling along the further wall, the one or more processors control the robotic surface treatment apparatus to back up by a predetermined amount before causing the robotic surface treatment apparatus to move forward to follow the further wall.

18. A robotic surface treatment apparatus as claimed in claim 16, further comprising detecting whether the robotic surface treatment apparatus is about to contact a second wall;
wherein, if the robotic surface treatment apparatus is about to contact the second wall, the one or more processors:
control the robotic surface treatment apparatus to be at a distance from the second wall, sufficient to enable the robotic surface treatment apparatus to turn the corner; and
cause the robotic surface treatment apparatus to pivot and move forward so that it follows the second wall.

19. A robotic surface treatment apparatus as claimed in claim 16, wherein the chassis has a D-shape with a substantially flat forward end.

20. A robotic surface treatment apparatus as claimed in claim 19, wherein the apparatus comprises a robotic vacuum having a brush extending along a substantial portion of the forward end, toward the forwardmost part of the forward end.

21. A processor-implemented method of controlling a robotic surface treatment apparatus, the method comprising:
  using one or more processors to detect whether the robotic surface treatment apparatus is about to traverse a corner as the robotic surface treatment apparatus travels along a first wall, by detecting whether the robotic surface treatment apparatus is no longer traveling along the first wall; and:
    if the robotic surface treatment apparatus is no longer traveling along the first wall:
    causing the robotic surface treatment apparatus to pivot and continue moving forward; and
    if the robotic surface treatment apparatus is traveling along a further wall, causing the robotic surface treatment apparatus to move forward to follow the further wall.

22. A processor-implemented method of controlling a robotic surface treatment apparatus as claimed in claim 21, wherein:
  if the robotic surface treatment apparatus is traveling along the further wall, the method further comprises using the one or more processors to control the robotic surface treatment apparatus to back up by a predetermined amount before causing the robotic surface treatment apparatus to move forward to follow the further wall.

23. A processor-implemented method of controlling a robotic surface treatment apparatus as claimed in claim 21, further comprising detecting whether the robotic surface treatment apparatus is about to contact a second wall;
  wherein, if the robotic surface treatment apparatus is about to contact the second wall, the one or more processors:
  control the robotic surface treatment apparatus to be at a distance from the second wall, sufficient to enable the robotic surface treatment apparatus to turn the corner; and
  cause the robotic surface treatment apparatus to pivot and move forward so that it follows the second wall.

24. A processor-implemented method of controlling a robotic surface treatment apparatus as claimed in claim 21, wherein the robotic surface treatment apparatus has a D-shape with a substantially flat forward end.

25. A processor-implemented method of controlling a robotic surface treatment apparatus as claimed in claim 24, wherein the apparatus comprises a robotic vacuum having a brush extending along a substantial portion of the forward end, toward the forwardmost part of the forward end.

26. A tangible recording medium containing processor-implemented instructions to perform a method of controlling a robotic surface treatment apparatus, the method comprising:
  using one or more processors to detect whether the robotic surface treatment apparatus is about to traverse a corner as the robotic surface treatment apparatus travels along a first wall, by detecting whether the robotic surface treatment apparatus is no longer traveling along the first wall; and
    if the robotic surface treatment apparatus is no longer traveling along the first wall, the one or more processors:
    cause the robotic surface treatment apparatus to pivot and continue moving forward; and
    if the robotic surface treatment apparatus is traveling along a further wall, cause the robotic surface treatment apparatus to move forward to follow the further wall.

27. A tangible recording medium containing processor-implemented instructions to perform a method of controlling a robotic surface treatment apparatus as claimed in claim 26, wherein:
  if the robotic surface treatment apparatus is traveling along the further wall, the one or more processors control the robotic surface treatment apparatus to back up by a predetermined amount before causing the robotic surface treatment apparatus to move forward to follow the further wall.

28. A tangible recording medium containing processor-implemented instructions to perform a method of controlling a robotic surface treatment apparatus as claimed in claim 26, further comprising detecting whether the robotic surface treatment apparatus is about to contact a second wall;
  wherein, if the robotic surface treatment apparatus is about to contact the second wall, the one or more processors:
  control the robotic surface treatment apparatus to be a distance from the second wall, sufficient to enable the robotic surface treatment apparatus to turn the corner; and
  cause the robotic surface treatment apparatus to pivot and move forward so that it follows the second wall.

29. A tangible recording medium containing processor-implemented instructions to perform a method of controlling a robotic surface treatment apparatus as claimed in claim 26, wherein the robotic surface treatment apparatus has a D-shape with a substantially flat forward end.

30. A tangible recording medium containing processor-implemented instructions to perform a method of controlling a robotic surface treatment apparatus as claimed in claim 29, wherein the apparatus comprises a robotic vacuum having a brush extending along a substantial portion of the forward end, toward the forwardmost part of the forward end.

* * * * *